US005208441A

United States Patent [19]

Broberg

[11] Patent Number: 5,208,441

[45] Date of Patent: May 4, 1993

[54] PLASMA ARC IGNITION SYSTEM

[75] Inventor: Daniel M. Broberg, Edina, Minn.

[73] Assignee: Century Manufacturing Co., Minneapolis, Minn.

[21] Appl. No.: 919,081

[22] Filed: Jul. 23, 1992

Related U.S. Application Data

[63] Continuation of Ser. No. 693,916, Apr. 29, 1991, abandoned.

[51] Int. Cl.[5] .......... B23K 9/00

[52] U.S. Cl. .......... 219/121.52; 219/121.57; 219/121.48; 219/75; 219/121.51

[58] Field of Search .......... 219/121.5, 121.48, 121.51, 219/121.52, 121.57, 121.54, 74, 75

[56] References Cited

U.S. PATENT DOCUMENTS

| | | | |
|---|---|---|---|
| 2,784,294 | 3/1957 | Gravert | 219/75 |
| 2,806,124 | 9/1957 | Gage | 219/75 |
| 2,923,809 | 2/1960 | Clews et al. | 219/75 |
| 3,004,189 | 10/1961 | Giannini | 315/111.21 |
| 3,082,314 | 3/1963 | Arata et al. | 219/121.51 |
| 3,131,288 | 4/1964 | Browning | 219/121.52 |
| 3,180,967 | 4/1965 | Hill | 219/121.48 |
| 3,209,193 | 9/1965 | Sheer et al. | 313/231.31 |
| 3,214,623 | 10/1965 | Sheer | 313/231.31 |
| 3,272,962 | 9/1966 | Mauskapf | 219/75 |
| 3,317,704 | 5/1967 | Browning | 219/75 |
| 3,463,957 | 8/1969 | Fuksiewicz | 219/121.51 |
| 3,534,388 | 10/1970 | Ito et al. | 219/75 |
| 3,562,486 | 2/1971 | Hatch | 219/75 |
| 3,567,898 | 3/1971 | Fein | 219/75 |
| 3,597,649 | 8/1971 | Bykhovsky et al. | 219/75 |
| 3,619,549 | 11/1971 | Hogan et al. | 219/121.52 |
| 3,641,308 | 2/1972 | Couch, Jr. et al. | 219/121.52 |
| 3,787,247 | 1/1974 | Couch, Jr. | 219/121.52 |
| 3,813,510 | 5/1974 | Hatch | 219/75 |
| 3,833,787 | 9/1974 | Couch, Jr. | 219/75 |
| 4,024,373 | 5/1977 | Bykhovsky et al. | 219/121.48 |
| 4,203,022 | 5/1980 | Couch, Jr. et al. | 219/121.5 |
| 4,268,740 | 5/1981 | Sanders | 219/121.5 |
| 4,324,971 | 4/1982 | Frappier | 219/121.51 |
| 4,361,748 | 11/1982 | Couch, Jr. | 219/121.5 |
| 4,395,030 | 10/1981 | Hosoda et al. | 219/75 |
| 4,463,245 | 7/1984 | McNeil | 219/75 |
| 4,521,666 | 6/1985 | Severance, Jr. et al. | 219/121.52 |
| 4,558,201 | 12/1985 | Hatch | 219/121.51 |
| 4,567,346 | 1/1986 | Marhic | 219/121.57 |
| 4,581,516 | 4/1986 | Hatch et al. | 219/121.51 |
| 4,701,590 | 10/1987 | Hatch | 219/121.51 |
| 4,782,210 | 11/1988 | Nelson et al. | 219/75 |
| 4,788,408 | 11/1988 | Wlodarczyk et al. | 219/121.49 |
| 4,791,268 | 12/1988 | Sanders et al. | 219/121.57 |
| 4,896,016 | 1/1990 | Broberg et al. | 219/121.57 |

*Primary Examiner*—Mark H. Paschall
*Attorney, Agent, or Firm*—Dorsey & Whitney

[57] ABSTRACT

In accordance with the present invention, a plasma arc torch contact starting system has a torch head having an electrically conductive plasma exit nozzle at one end and a pilot arc chamber within the torch head immediately adjacent the plasma exit nozzle. An electrode is mounted in the torch head for movement relative to the nozzle. An arc-drawing mechanism is operably connected to but substantially thermally isolated from the electrode and the torch head for biasing the electrode into contact with the nozzle and for displacing the electrode from the nozzle to draw a pilot arc in the pilot arc chamber.

10 Claims, 6 Drawing Sheets

PLASMA ARC IGNITION SYSTEM

This is a continuation of application Ser. No. 693,916, filed Apr. 29, 1991, now abandoned.

FIELD OF THE INVENTION

The present invention relates to plasma arc torches for hand-held or machine-mounted use, primarily to cut metal. More particularly, the present invention relates to an apparatus and method for automatic contact starting an arc in a plasma arc torch.

BACKGROUND OF THE PRIOR ART

There are three methods discussed in the prior art for initiating a plasma arc discharge and starting a plasma arc torch. These are: high frequency or high voltage discharge; exploding wire; and contact starting. In recent years, several contact starting methods have come into use. Contact starting is advantageous, because it uses relatively low electrical voltage and avoids the cost of high frequency/high voltage discharge equipment and the associated electromagnetic interference.

One arrangement for contact starting a plasma arc torch is shown in U.S. Pat. No. 4,791,268. In this arrangement, a movable electrode, which acts as a cathode, is urged by a bias spring into contact with a fixed nozzle, which acts as the anode. The movable electrode is formed with a piston part slidingly fit within a cylinder (piston chamber) formed in the torch body. The electrode/cathode is automatically separated from the anode in response to the buildup of gas pressure in the piston chamber within the torch head. The gas pressure causes the piston part and the electrode to move against the force of the bias spring, breaking electrical contact between the electrode and the nozzle. A pilot arc is formed by the separation of the electrode and the nozzle. The same gas flow that is used to drive the piston part also feeds the plasma arc.

Another arrangement for contact starting a plasma arc torch is shown in U.S. Pat. No. 4,896,016. In this arrangement, the electrode is also movable, but it is powered by an over-center spring arrangement, actuated by the operator's forefinger or thumb. Contact between the electrode and nozzle is broken by actuation of the over-center mechanism.

A third arrangement for contact starting a plasma arc torch is shown in U.S. Pat. No. 3,242,305. In this arrangement, the electrode is also movable, but it is actuated by a piston axially linked to the electrode. The piston is powered by a flow of cooling water for the torch head. The chamber in which the piston moves is part of the same torch head that contains the electrode and the region in which the pilot arc is formed.

U.S. Pat. No. 4,791,268 also discusses prior art contact starting systems in which the cathode is the electrode and the nozzle through which the plasma jet passes serves as the electrical conductor connecting the electrode to the workpiece. In these systems, the nozzle is spring mounted and slidable with respect to the electrode and is forced into contact with the electrode (usually against the force of a bias spring) when it is pressed against the workpiece. Thus, the electrode, nozzle and workpiece are all in electrical series connection when the current flow is initiated. When the electrode is manually backed away from the workpiece, the nozzle is allowed to separate from the electrode and return to its normal position. Because such systems require that the nozzle be pushed against the workpiece to force the nozzle and electrode into contact, they are hard to control and not suitable for work on delicate workpieces. U.S. Pat. Nos. 2,898,441 and 4,567,346 show specific designs for such a push-start torch head.

The foregoing arrangements have certain other disadvantages. U.S. Pat. No. 4,896,016 avoids the need for a complex electrode actuation mechanism but is not practical for remote-controlled operation as in U.S. Pat. No. 3,242,305, because there is no mechanism that can be actuated by remote control of a flow of fluid acting on a cylinder. Most plasma arc electrodes last for about one hour of operation before replacement is required. The arrangement shown in U.S. Pat. No. 4,791,268 has an electrode that is expensive to replace, because it has a piston part that is formed as part of the electrode. Because a close-fitting piston part must be machined and the entire electrode-piston element must be replaced, the operating costs of this form of torch are relatively high.

In the piston-actuated prior art devices, the plasma flame chamber and the piston chamber are both within the torch head. (In U.S. Pat. No. 4,791,268 they are a single chamber.) Thus, the cylinder-piston mechanism is subject to the elevated temperatures present in the vicinity of a plasma arc. The cylinder-piston mechanism and the surrounding parts are subject to thermal stress, differential expansion and other thermal-related phenomena that complicate design. Moreover, to construct a torch head of this type that is small enough to be conveniently usable, the cylinder must be made relatively small and, consequently, low-powered. Heat changes the dimensions of the copper parts typically used and scale builds up on some moving parts during operation. Both of these increase friction, which may ultimately impair operation of a low-powered cylinder.

The device of U.S. Pat. No. 3,242,305 has many of the same problems. Although it appears to be constructed so that the electrode and the piston are mechanically separable parts, the electrode and the piston are all part of essentially the same thermal mass. Thus, the piston and its associated cylinder must be provided with fluid flow for cooling, complicating design of the plasma arc head and/or must be made of special materials that can accommodate thermal stress and differential thermal expansion. The latter can be a particularly difficult issue for the close fits that are typically necessary for a piston-cylinder combination. Also, when the fluid used for cylinder actuation is water, there is a danger of leaks.

In sum, a design for contact starting a plasma arc that remedies the above described deficiencies of the prior art would be a decided advance and permit more reliable, less expensive plasma arc torch equipment to be made.

SUMMARY OF THE INVENTION

In accordance with the present invention, a plasma arc torch contact starting system has a torch head having an electrically conductive plasma exit nozzle at one end and a pilot arc chamber within the torch head immediately adjacent the plasma exit nozzle. An electrode is mounted in the torch head for movement relative to the nozzle. An arc-drawing mechanism is operably connected to but substantially thermally isolated from the electrode and the torch head for biasing the electrode into contact with the nozzle and for displacing the electrode from the nozzle to draw a pilot arc in the pilot arc chamber.

An objective of the present invention is to provide a plasma arc contact starting device that has an inexpensive, easily-replaced electrode.

Another objective of the present invention is to provide a plasma arc contact starting apparatus that may be actuated by remote control.

A further objective of the present invention is to provide a plasma arc contact starting apparatus in which increased reliability is achieved for the mechanism that moves the electrode relative to the nozzle.

Other objectives and advantages of the invention will become more fully apparent and understood with reference to the following specification and to the appended claims and drawings.

DESCRIPTION OF THE PREFERRED EMBODIMENT

Figure 1A:
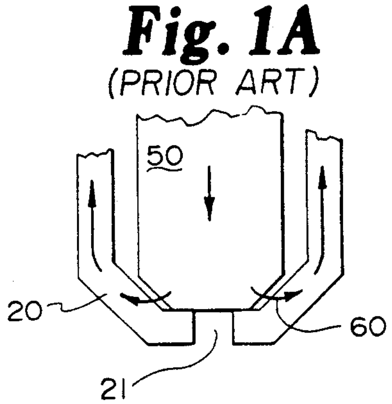
Fig. 1A (PRIOR ART)
FIG. 1A is a simplified schematic diagram of an electrode contained within and contacting the nozzle of a plasma arc torch near the nozzle orifice as known in the prior art.
Figure 1B:
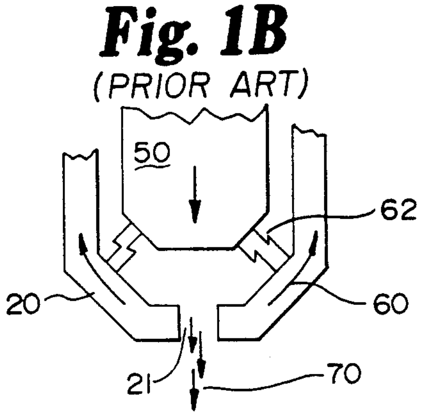
Fig. 1B (PRIOR ART)
FIG. 1B is a simplified schematic diagram of an electrode contained within the nozzle of a plasma arc torch and displaced from the nozzle near its orifice to cause a pilot arc to form by the contact starting method known in the prior art.

FIGS. 1A and 1B show the basic principle of contact starting a plasma arc torch as known in the prior art. When it is desired to start the torch, the electrode 50 is in contact with the interior of the nozzle 20 near the nozzle orifice 21. This allows the electrical current, when applied to start the torch, to flow as shown by arrows 60. The direct contact between nozzle 20 and electrode 50 means that no significant plasma is formed. As the electrode 50 is separated from the nozzle 20, the current flow 60 continues via a pilot arc 62 that exists across the gap between the now-separating nozzle 20 and electrode 50. Plasma is formed and plasma flow 70 escapes from the nozzle orifice 21 toward the workpiece (not shown in FIG. 1A).

Figure 2:
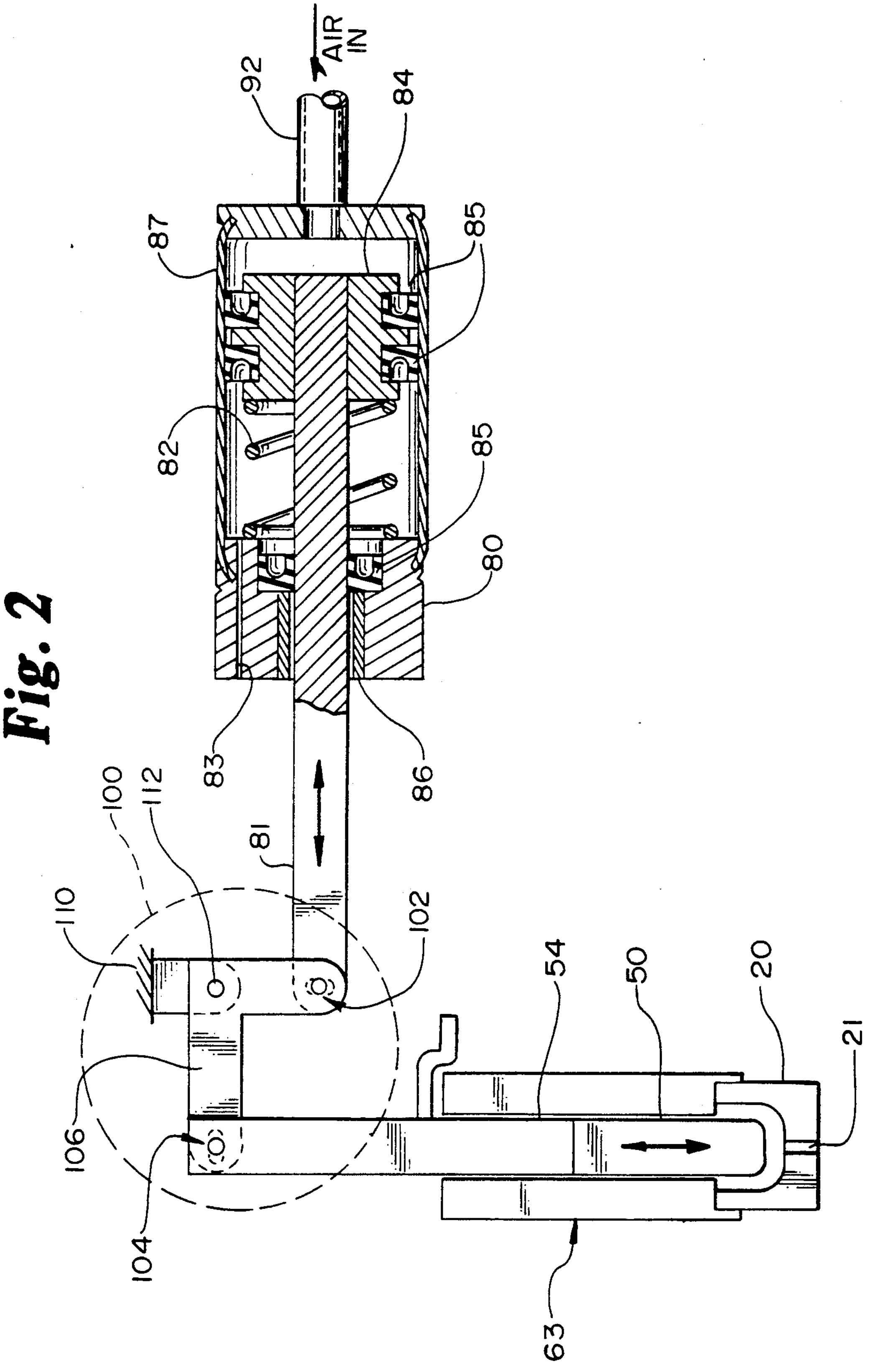
FIG. 2 is a simplified schematic diagram of the present invention.

FIG. 2 shows, in simplified form, the basic operating principles of the present invention. Instead of building the actuating mechanism (preferably an air cylinder) for separation of the electrode 50 and nozzle 20 as part of a unitary torch head assembly, comprising essentially a common thermal mass, the present inventor recognized the value of separating the actuating cylinder from the cramped and thermally stressful environment of the torch head. FIG. 2 shows a mechanism for linking an air cylinder 80 held within a torch handle housing (not shown in FIG. 2) with the electrode 50 contained in a separate torch head 63 that extends out of the handle housing. The air cylinder 80 is located away from the torch head 63 and operably connected to the electrode 50 in such a way that the cylinder 80 is substantially thermally isolated from the torch head 63 and not subject to the spatial constraints of the torch head 63. That is, the actuating mechanism (or arc-drawing means) is not part of the thermal mass in which the plasma arc is generated. The linkage mechanism providing operable connection includes a plunger 54 that is connected to the electrode 50 for reciprocal, in-line motion. The air cylinder 80 includes a cylinder body 87, within which is located a piston 84 with cup seals 85 for engaging the internal walls of the cylinder body 87. Additional cup seals 85 located adjacent piston rod bushings 86 seal around the piston rod 81. A return spring 82 encircles the piston rod 81. One end of the spring 82 engages one side of the piston 84, while the other end engages the fixed end of the cylinder body 87 adjacent the bushing 86 and its accompanying cup seals 85. Conduit 92 brings air into the cylinder body 87 on the side of the piston 84 opposite the side contacted by the return spring 82.

Piston rod 81 reciprocates in accordance with the opposing forces of the air delivered through conduit 92 (acting on one side of the piston 84) and the return spring 82 (acting on the other side of the piston 84). This reciprocal motion is delivered to a motion translation mechanism 100, comprising a pivot link 106 with a first floating pivot 102 at one end thereof, which is connected to piston rod 81. Pivot link 106 is mounted for limited angular movement around a pivot point 112 that is fixed in the torch handle housing (not shown in FIG. 2). At the opposite end of the pivot link 106 is a second floating pivot 104 that is connected to the plunger 54. As can be seen, the reciprocal motion of the piston 84 is translated into reciprocal motion of the plunger 54 and electrode 50 via the piston rod 81 and link 106. This permits the electrode 50 to be selectively brought into contact with the nozzle 20 and then separated from the nozzle 20, under control of the arc drawing means, to perform contact starting of the torch.

Figure 3:
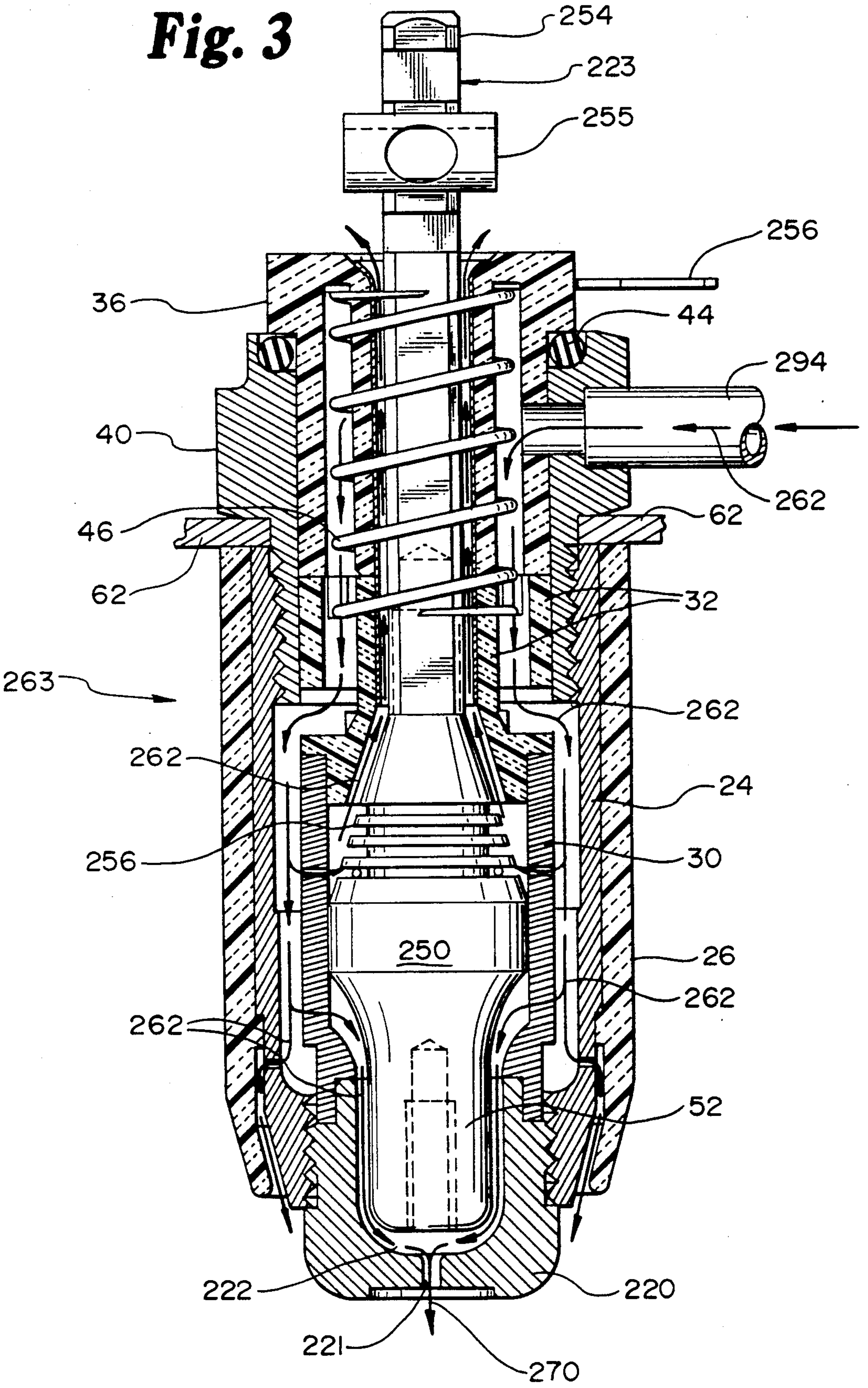
FIG. 3 is a cross-sectional view of a torch head having an electrode and nozzle as used in the present invention, with arrows showing the gas flow for the plasma arc.
Figure 4:
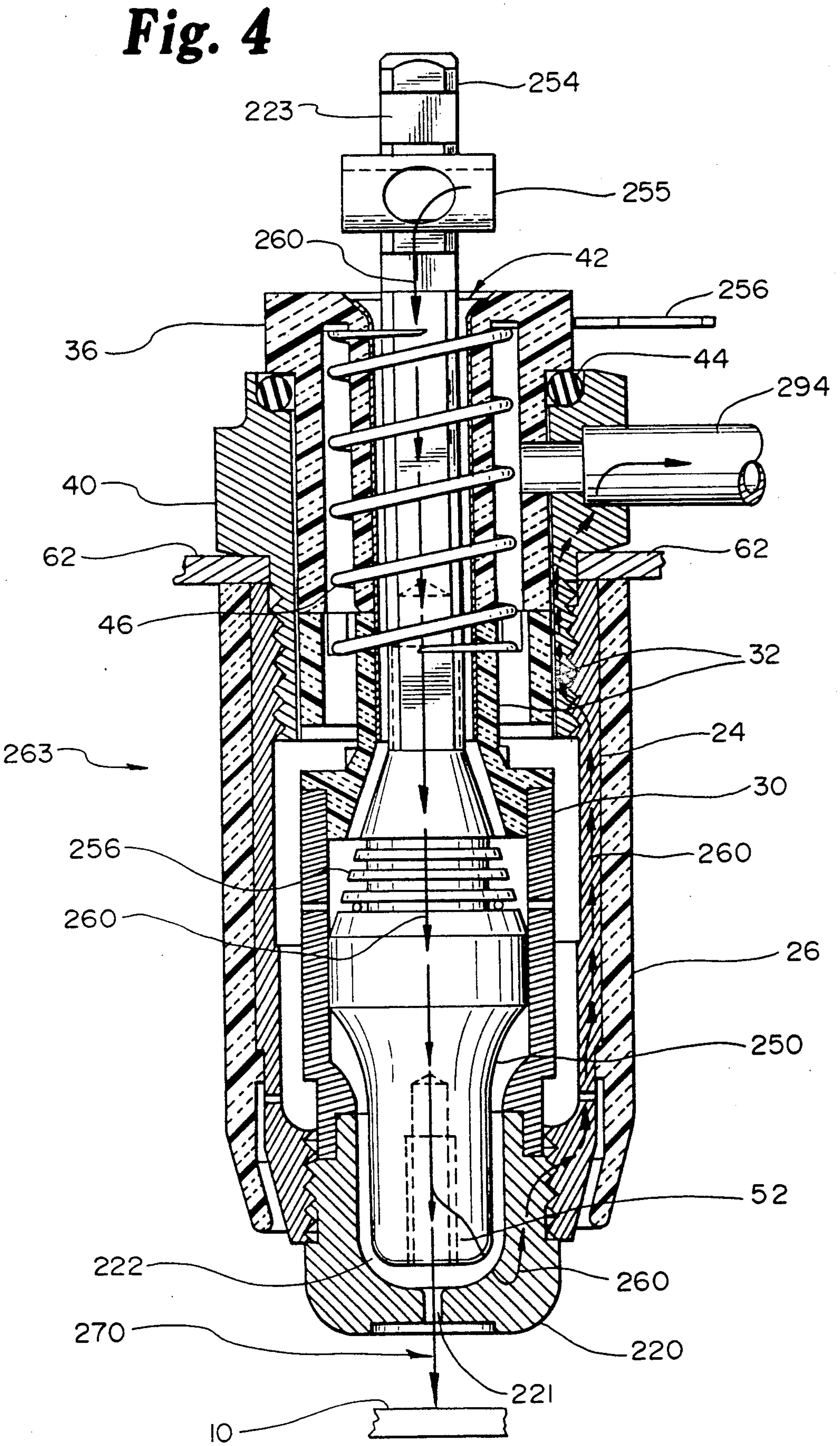
FIG. 4 is a cross-sectional view of a torch head having an electrode and nozzle as used in the present invention, with arrows showing the electrical circuit for the plasma arc.
Figure 5:
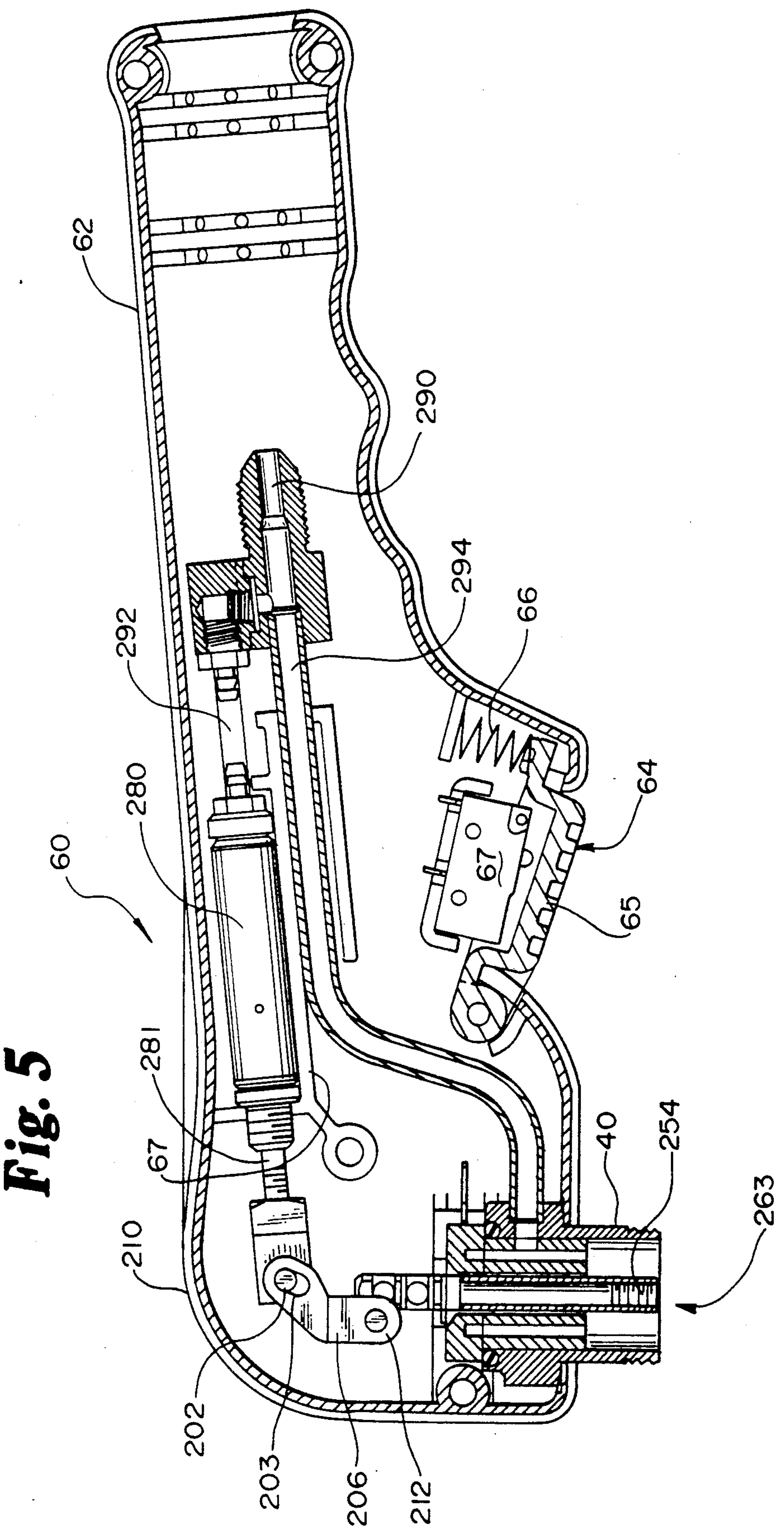
FIG. 5 is a cross-sectional diagram of a hand-held plasma arc torch according to the present invention showing the non-activated position of the arc-drawing mechanism linked to the electrode but with other details of the torch head omitted for clarity.
Figure 6:
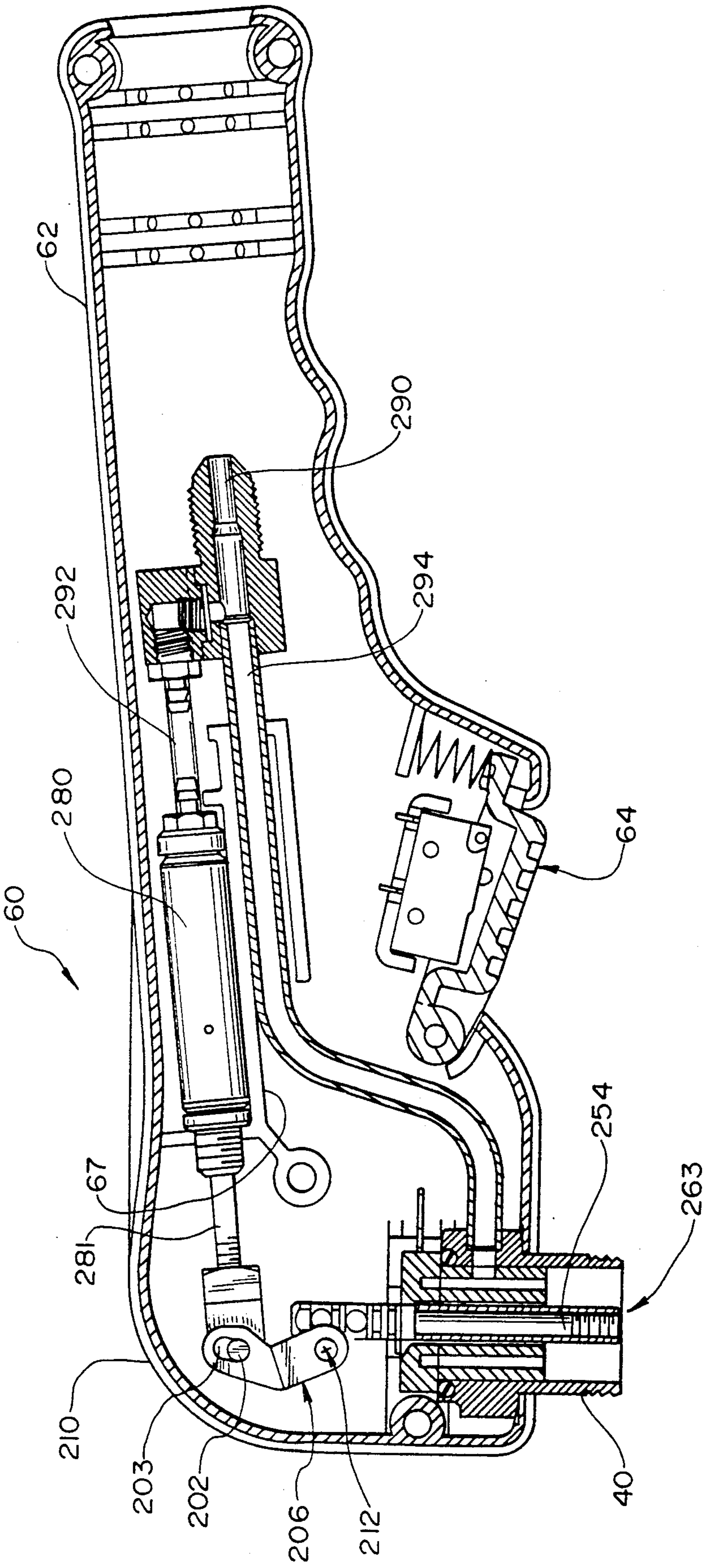
FIG. 6 is a cross-sectional diagram of a hand-held plasma arc torch according to the present invention showing the activated position of the arc-drawing mechanism linked to the electrode but with other details of the torch head omitted for clarity.

FIGS. 3–8 show in greater detail a preferred embodiment of the present invention. FIGS. 5–6 show the interior of a hand-held plasma torch 60 constructed in accordance with the present invention. The torch 60 includes a pair of torch handle housing halves 62, only one of which appears in FIGS. 5–6. The torch 60 also includes a control switch assembly 64, with a pivoting trigger piece 65 biased at one end with a trigger spring 66. Motion of the trigger piece 65 brings it into contact with microswitch 67, which in turn, controls delivery of electrical current and pressurized gas (preferably air) to the torch head assembly 263 in a conventional manner. The torch head assembly 263 extends from one end of the torch handle housing 62. For simplicity, in FIGS. 5 and 6, only the brass housing 40 of the torch head assembly 263 is shown, together with the brass plunger 254.

FIGS. 3 and 4 show the details of torch head assembly 263. A nozzle 220 (preferably made of copper) includes a nozzle orifice 221 and forms a pilot arc chamber 222 at the tip of the torch head assembly 263. The nozzle 220 is connected to a brass nozzle cap 24. A nozzle insulating shield 26 (preferably made of ceramic or other electrical insulating material) surrounds the brass nozzle cap 24 from the end closest to the nozzle 220 back toward the opening at which the torch head assembly 263 extends from the torch handle housing 62.

Within the brass housing 40 and extending outwardly therefrom in the direction of the plunger 254 is a plunger housing 36 (preferably made of insulator material), formed with an inner and an outer concentric tube structure. A gasket 44 forms an air seal between the plunger housing 36 and the brass housing 40. Abutting the plunger housing 36 is an additional insulator insert 32, also consisting of two generally concentric tubular segments, the innermost of which is fitted to a swirl tube 30 that extends into contact with and is fitted to the nozzle 220. Within the plunger housing 36 is a brass guide sleeve 42. The plunger 254 extends through the brass guide sleeve 42 to connect to the electrode 250, with its hafnium insert 52. The connection between the plunger 254 and the electrode 250 is preferably threaded. An spring 46 surrounds the plunger 254, the brass guide sleeve 42 and the inner tubular structure of the plunger housing 36. One end of the spring 46 is seated in a web connecting the inner and outer tubular structures of the plunger housing 36, while the other end is seated in notches in the insulator insert 32 located between its inner and outer tubular structures. The spring 46 is compressed when all of the parts of the torch head assembly 263 are in place as in FIGS. 3 and 4 and thus serves a link in a parts-in-place safety circuit when the swirl tube 30 and nozzle 220 are correctly installed.

At the end of the plunger 254 opposite its connection to the electrode 250, there is a pair of transverse slots 223 (one on each side of the plunger 254) that are used in the linkage of the plunger 254 to the piston rod 281, as will be explained below. Adjacent the slots 223 is an electrical connection fitting 255, which is part of the circuit delivering current to the electrode 250. Connected to that end of the plunger housing 36 nearest the fitting 255 is a parts-in-place circuit connection 256. (This circuit connection is explained in greater detail in U.S. Pat. No. 4,940,877.)

As best seen in FIG. 4, the electrical circuit path for the torch head assembly 263, is indicated by arrows 260. The path includes the fitting 255, the plunger 254, the electrode 250, the pilot arc (when formed), the nozzle 220, the nozzle cap 24, the brass housing 40 and the copper tube 294 that delivers air (or other pressurized gas) to the cylindrical space that lies between the inner and outer tubular structures of the plunger housing 36. FIG. 3 shows the air flow path for the torch head assembly 263 by means of arrows 262. The air path begins at tube 294 and travels in annular spaces through the plunger housing 36 and insulator 32 toward the nozzle 220, before one portion of the flow enters swirl tube 30 to flow over electrode cooling fins 256 and then travel inside the brass guide sleeve 42 to exit near fitting 255, while the other portion continues flowing towards the nozzle 220. Another portion of this continuing flow enters the swirl tube 30 at vortex generating tangential holes to travel along the surface of the electrode 250 and exit at the nozzle orifice 221, while the remaining portion enters the space between the brass nozzle cap 24 and the nozzle cap shield 26 to exit along the exterior of the nozzle 220.

Turning again to FIGS. 5–6, it can be seen that the cylinder 280 is mounted on a cylinder support structure 67 within the torch handle housing 62. A primary flow of compressed air is delivered to a conduit 290, which separates the primary flow into two parts, one through a conduit 292 to the air cylinder 280 of the arc drawing means and the other through a conduit 294 that connects to the housing 40 of torch head assembly 263. The air cylinder 280 functions generally in the manner of the cylinder shown in greater detail in FIG. 2; that is, it contains a piston, return spring and seals (not shown in FIGS. 5 and 6) and provides reciprocating motion for a piston rod 281. The end of the piston rod 281 that extends out of the cylinder 280 is connected to floating pivot 202 at a pivot slot 203 in pivot link 206. The pivot link 206 rotates around fixed pivot point 212.

Figure 7:
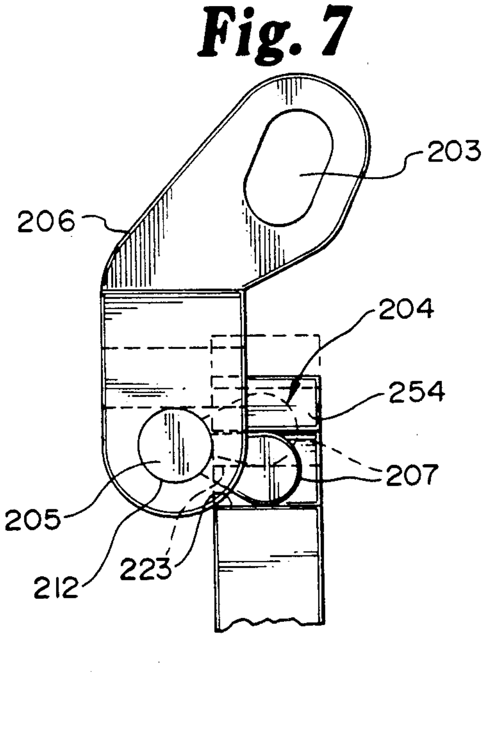
FIG. 7 is a plan view of the pivoting linkage between the piston rod and the plunger attached to the electrode as used in the torch of FIGS. 5 and 6.
Figure 8:
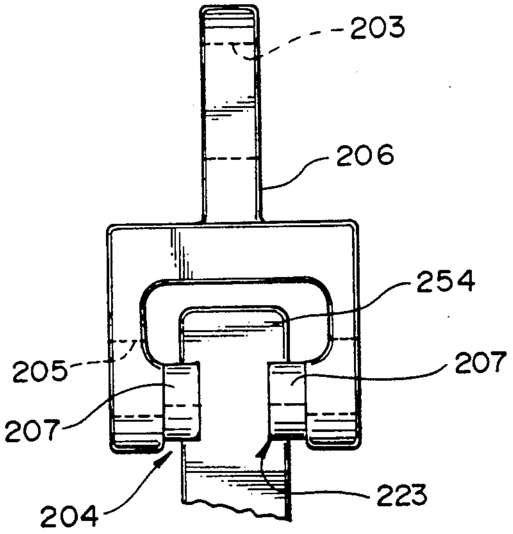
FIG. 8 is a side view of the pivoting linkage between the piston rod and the plunger attached to the electrode as used in the torch of FIGS. 5 and 6.

As best seen in FIGS. 7 and 8, the pivot link 206 is operably connected to the plunger 254 at the transverse slots 223 that are located on opposite sides of the plunger 254. The connection is formed by opposed cam lobes 207, one on each side of the interior of the floating pivot 204. The solid and dashed lines in FIG. 7 indicate the two extreme positions of the cam lobes 207 when the pivot link 206 rotates around the fixed pivot point 212 and the corresponding positions of the end of the plunger 254. FIG. 5 shows the position of the piston rod 281 when the cylinder 280 is not activated. To ignite the arc, the operator activates trigger assembly 64, causing pressurized air to enter conduit 290 and electrical current to be delivered to the torch head assembly 263. Current flows in a "dead short" mode for a brief period as air enters cylinder 280, because the electrode 250 is in direct contact with the nozzle 220. When pressurized air builds up in the cylinder 280, piston rod 281 extends toward pivot link 206 and causes it to rotate a few degrees in the counterclockwise direction (as viewed in FIGS. 5 and 6). This causes the cam lobes 207 and the plunger 254 to assume the position shown in dashed lines in FIG. 7. The electrode 250 is thus drawn away from the nozzle 220 so as to strike an arc in the pilot arc chamber 222. The gap in which the arc forms is approximately 0.06 inches wide. The plasma developed by the arc and the flow of gas through the arc exits at the nozzle orifice 221. This can be transferred to a workpiece 10, as shown in FIG. 4, in the known manner (see, e.g., U.S. Pat. No. 4,791,268).

Briefly stated, the motion of the electrode 250 away from the nozzle 220 strikes a pilot arc or non-transferred arc that leaves the electrode 250 and attaches to the inside of nozzle 220. This non-transferred arc can be blown out the orifice 221 by the flow of gas exiting from the nozzle orifice 221 and attach to the outside surface of the nozzle 220. A transferred arc (the preferred type of arc for cutting and maximum life of consumable parts) occurs when the non-transferred arc approaches the grounded workpiece 10 and the arc attachment point changes from the nozzle 220 to the workpiece 10.

It will be seen that with the present invention a simple, inexpensive electrode can be used. The cylinder (or other prime mover of the arc drawing means) used to actuate ignition may be larger than one constrained by the dimensions of a small torch head, and therefore may be as powerful as needed. Moreover, the cylinder need have no special thermal design, because it is substantially thermally isolated from the heat of the plasma arc. Its seals, lubricants and parts need not accomodate high temperatures. The hottest parts of the torch head are not close to the cylinder, and heat cannot easily migrate along the linkage to the cylinder. The cylinder 280 is not part of the same thermal mass as the torch head assembly 263, where the greatest heat exists. The torch head assembly 263 extends from the torch handle housing 62 and thus dissipates most of its heat to the atmosphere rather than the interior of the torch handle housing 62. An additional feature of the linkage (besides translation of motion) is its ability to multiply the cylinder actuation force through a mechanical advantage. The mechanical advantage allows the piston in cylinder 280 to provide more actuation force than an equal-sized piston integral to the torch head. Added force is helpful to overcome friction that can increase with age, wear and abuse of the tool. The degree of mechanical advantage arises because the distance between pivot points 212 and 202 is several times the distance between pivot points 212 and 204.

A number of variations of the present invention can be made. For example, it is not necessary to use the specific form of mechanical linkage used between the plunger 254 and the piston rod 281. In particular, although in the preferred embodiment shown, the direction of motion of the cylinder 280 and the motion of the electrode 250 are essentially orthogonal, this results from the desire to produce a hand-held torch. If the plasma arc were produced in a piece of automated equipment, the torch handle housing 62 would be replaced by an actuator housing to support and held thermally isolate the arc-drawing means. In such equipment, it might be more convenient to locate the cylinder so that its piston rod is axially aligned with the electrode. While it is convenient to use an air cylinder or other gas-actuated cylinder, another form of prime mover, such as a solenoid might be used as the arc-drawing means. All such modifications are intended to fall within the scope of the appended claims.

What is claimed as new and desired to be protected by Letters Patent is:

1. A plasma arc torch contact starting system comprising:
   - a torch head having an electrically conductive plasma exit nozzle at one end and a pilot arc chamber within said torch head immediately adjacent the plasma exit nozzle;
   - an electrode mounted and supported in said torch head for movement relative to the nozzle;
   - means for biasing the electrode into electrical contact with the nozzle;
   - means for supplying a flow of pressurized gas to the pilot arc chamber; and
   - arc-drawing means operably connected to but substantially thermally isolated from the electrode and the torch head for delivering current to the electrode and subsequently displacing the electrode from the nozzle to draw a pilot arc in the pilot arc chamber, wherein the arc-drawing means displaces the electrode in response to pressurized gas diverted from the flow of pressurized gas supplied to the pilot arc chamber, said substantial thermal isolation being effected by placing the arc-drawing means so that it is not within the thermal mass of the torch head that contains the pilot arc chamber and supports the electrode.

2. The system as recited in claim 1 wherein the pressurized gas is air.

3. The system as recited in claim 1 wherein the arc-drawing means comprises a gas-actuated cylinder.

4. The system as recited in claim 3 wherein the gas-actuated cylinder is biased by a spring into one position in which the electrode is in contact with the nozzle.

5. The system as recited in claim 3 wherein the pressurized gas is air.

6. The system as recited in claim 1 wherein the arc-drawing means is operably connected to the electrode by a mechanical linkage.

7. The system as recited in claim 6, wherein the mechanical linkage includes a pivot link with a fixed pivot and a floating pivot at each end of the pivot link.

8. The system as recited in claim 6 wherein the mechanical linkage provides mechanical advantage.

9. The system as recited in claim 1 wherein the arc drawing means comprises a gas-actuated cylinder with a piston rod and the movement of the electrode is responsive to and substantially orthogonal to the movement of the piston rod.

10. A method for contact starting a plasma arc torch having a torch head with a plasma exit nozzle at one end and a pilot arc chamber within said torch head immediately adjacent the plasma exit nozzle, comprising:
    - providing an electrode mounted and supported in said torch head for movement relative to the nozzle and biased into electrical contact with the nozzle;
    - providing a gas-actuated cylinder operably connected to but substantially thermally isolated from the electrode and the torch head for displacing the electrode from the nozzle, said substantial thermal isolation being effected by placing the arc-drawing means so that it is not within the thermal mass of the torch head that contains the pilot arc chamber and supports the electrode;
    - providing a primary flow of pressurized gas to the pilot arc chamber;
    - providing a current to the electrode; and
    - diverting a portion of the primary flow of pressurized gas to actuate the gas-actuated cylinder to displace the electrode from the nozzle and draw a pilot arc in the pilot arc chamber.

* * * * *